(12) United States Patent
Jaradi et al.

(10) Patent No.: US 10,399,536 B2
(45) Date of Patent: Sep. 3, 2019

(54) SEATBELT ANCHOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/729,571

(22) Filed: Oct. 10, 2017

(65) Prior Publication Data

US 2019/0106080 A1 Apr. 11, 2019

(51) Int. Cl.
*B60R 22/18* (2006.01)
*B60R 22/28* (2006.01)

(52) U.S. Cl.
CPC .............. *B60R 22/18* (2013.01); *B60R 22/28* (2013.01)

(58) Field of Classification Search
CPC ... B60R 22/18; B60R 22/28; B60R 2022/288; B60R 2022/289; B60R 2022/281; B60R 2022/286; B60R 2022/1806
USPC .................. 267/180, 179, 407–472; 280/805
See application file for complete search history.

(56) References Cited

U.S. PATENT DOCUMENTS

| | | | | | |
|---|---|---|---|---|---|
| 3,438,674 | A | * | 4/1969 | Booth | B60R 22/28 188/375 |
| 3,482,872 | A | * | 12/1969 | Chamberlain | B60R 22/28 188/371 |
| 3,804,396 | A | * | 4/1974 | Seybold | B60R 22/28 188/371 |
| 4,060,278 | A | * | 11/1977 | Maeyerspeer | B60R 22/28 188/376 |
| 4,201,418 | A | | 5/1980 | Reidelbach et al. | |
| 4,832,410 | A | * | 5/1989 | Bougher | B60R 22/18 297/474 |
| 4,919,484 | A | * | 4/1990 | Bougher | B60R 22/02 280/801.1 |
| 4,979,400 | A | * | 12/1990 | Bartholomew | G01D 1/00 116/203 |
| 5,005,909 | A | * | 4/1991 | Fohl | B60R 22/28 297/468 |
| 5,037,132 | A | | 8/1991 | Borlinghaus et al. | |
| 5,344,096 | A | * | 9/1994 | Frei | B60R 22/42 242/379 |
| 5,755,018 | A | * | 5/1998 | Grolik | B60R 22/1952 24/68 SB |
| 6,183,015 | B1 | | 2/2001 | Smithson et al. | |
| 7,347,108 | B2 | | 3/2008 | Kaijala | |
| 8,641,096 | B1 | | 2/2014 | Kohlndorfer | |
| 9,358,914 | B2 | | 6/2016 | Humbert | |
| 2004/0016304 | A1 | * | 1/2004 | Kaijala | B60R 22/18 73/862.69 |
| 2005/0012319 | A1 | * | 1/2005 | Schulz | B60R 22/28 280/805 |
| 2006/0042850 | A1 | | 3/2006 | Mendis | |

(Continued)

*Primary Examiner* — Christopher Garft
(74) *Attorney, Agent, or Firm* — Frank A. MacKenzie; Bejin Bieneman PLC

(57) ABSTRACT

A seatbelt assembly includes a monolithic anchor having a first plate, a second plate spaced from the first plate, and a spring connecting the first plate to the second plate. The first plate has a webbing mount. The second plate has a vehicle mount.

17 Claims, 4 Drawing Sheets

(56) References Cited

U.S. PATENT DOCUMENTS

2007/0058163 A1\* 3/2007 Handman ................ G01C 3/22
356/152.1
2011/0277281 A1\* 11/2011 Metzger ................. B60R 22/18
24/662
2017/0050677 A1\* 2/2017 Czinger ................. B62D 21/17

\* cited by examiner

SEATBELT ANCHOR

BACKGROUND

A vehicle restraint system includes a seatbelt assembly that functions to reduce the likelihood of death or serious injury in a traffic collision or sudden stop by reducing the force of secondary impacts. In the process of restraining an occupant loads may be applied across the chest or lap by the seatbelt webbing. Specifically, the seatbelt assembly includes a webbing that extends across the chest and lap of the occupant. During the vehicle collision, the webbing applies loads across the chest or lap of the occupant while securing the occupant to the seat.

DETAILED DESCRIPTION

Figure 1:
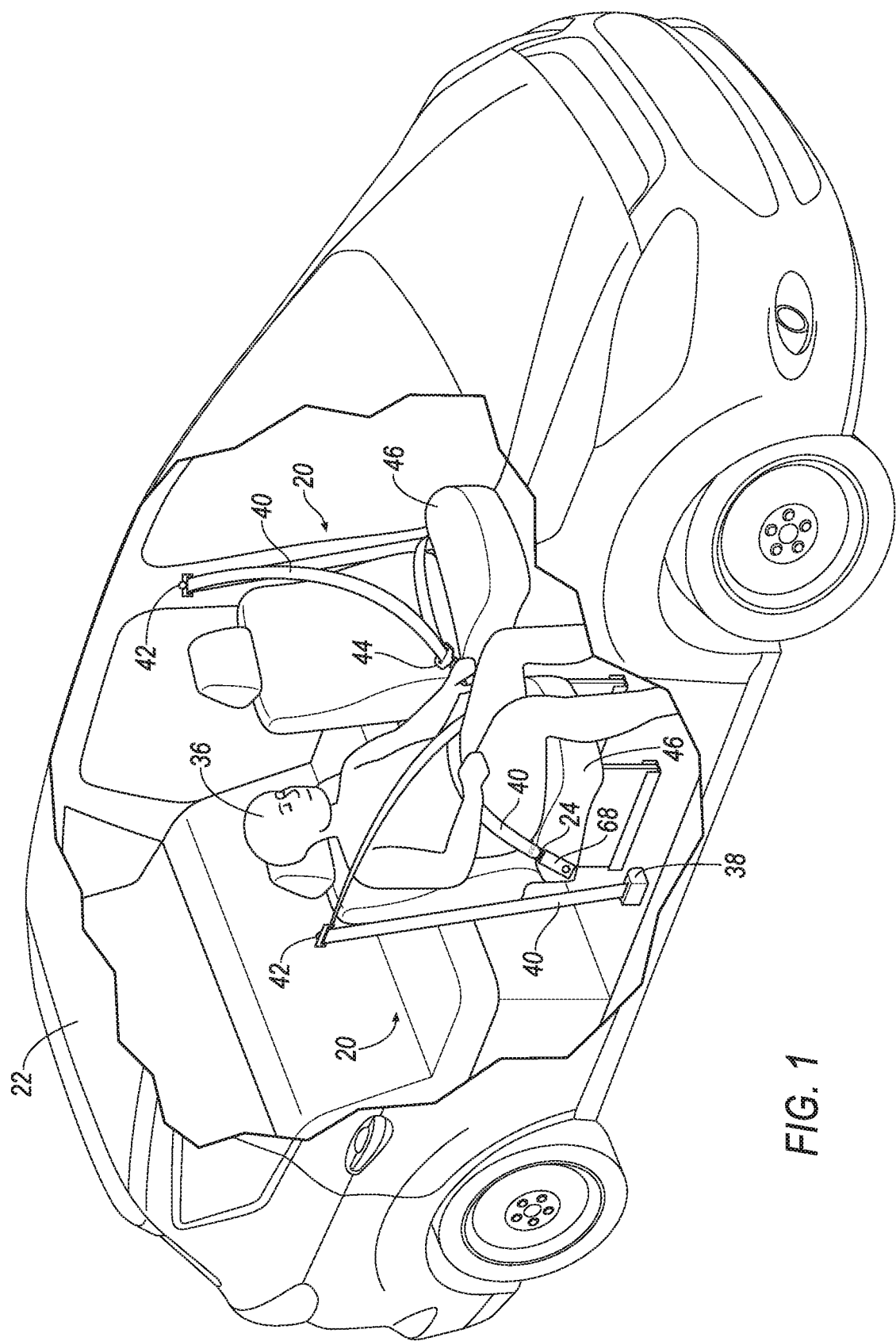
FIG. 1 is a perspective view of a vehicle including multiple seatbelt assemblies.
Figure 2:
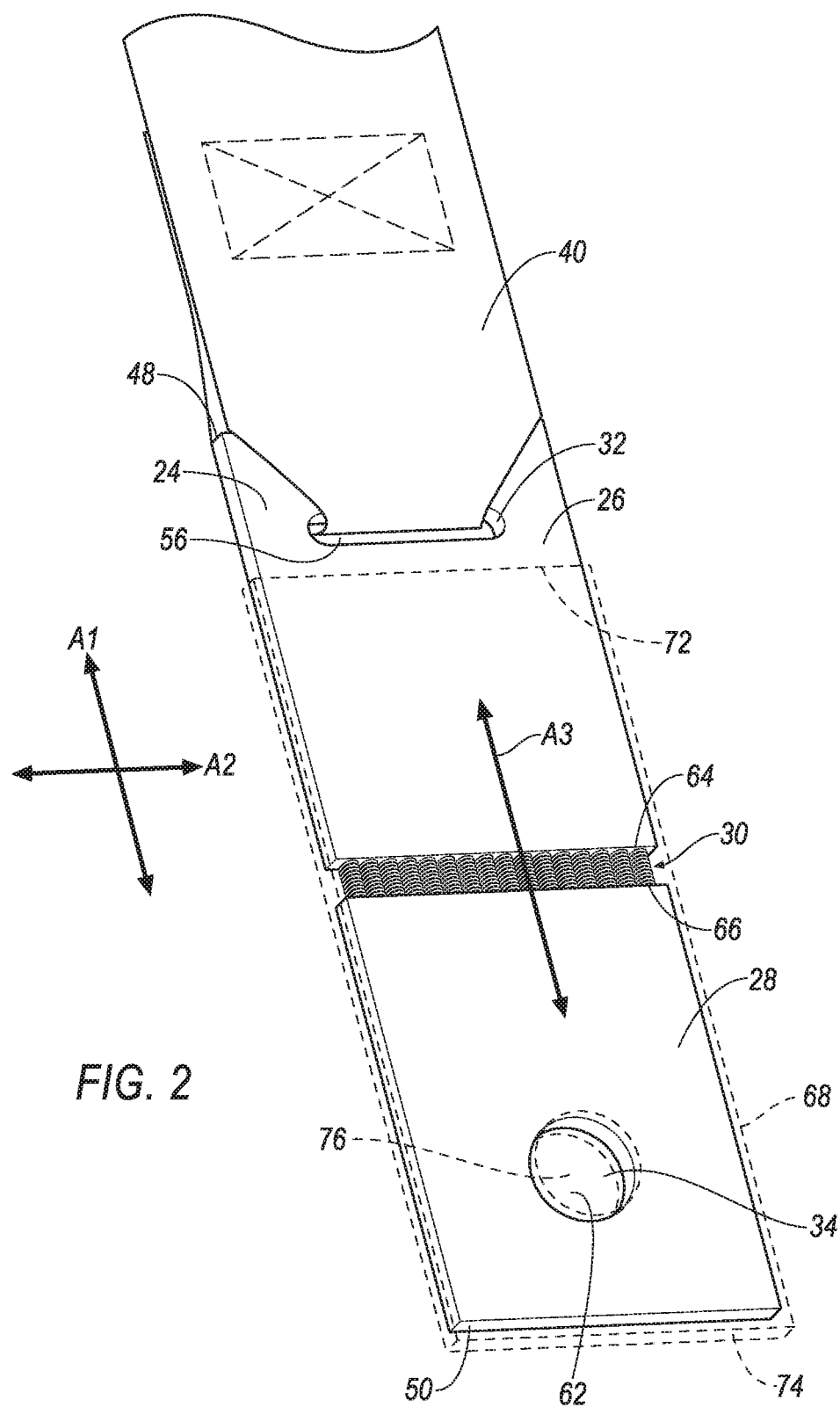
FIG. 2 is a perspective view of an anchor of the seatbelt assembly of FIG. 1.

A seatbelt assembly includes a monolithic anchor having a first plate, a second plate spaced from the first plate, and a spring connecting the first plate to the second plate. The first plate has a webbing mount. The second plate has a vehicle mount.

The spring may be a coil spring.

The monolithic anchor may be metal.

The seatbelt assembly may include a sleeve, the monolithic anchor may be disposed within the sleeve.

The sleeve may include an open end and a closed end opposite the open end, the first plate may extend from the sleeve at the open end.

The sleeve may define a chamber, and the spring may be completely disposed within the chamber.

The sleeve may be plastic.

The vehicle mount may be a first hole, and the sleeve may define a second hole axially aligned with the first hole.

The spring may be designed to deform upon application of a threshold amount of force, the threshold amount of force may be based on a standard crash test dummy.

The standard crash test dummy may be a Hybrid III 50th percentile male dummy.

The monolithic anchor may be 3-D printed.

The monolithic anchor may have a longitudinal axis, and the first plate, the second plate, and the spring may be aligned along the longitudinal axis, and the spring may be less stiff than the first plate and the second plate along the longitudinal axis.

The spring may be less stiff than the first plate and the second plate under tension.

The monolithic anchor may have a lateral axis and may include a plurality of springs spaced from each other along the lateral axis connecting the first plate to the second plate.

The seatbelt assembly may include a webbing secured to the first plate.

The webbing mount may be a slot, and the webbing may be disposed within the slot.

The first plate, the second plate, and the spring may be formed of a same type of material.

The monolithic anchor may be made of stainless steel.

The first plate may have a first thickness, the second plate may have a second thickness, and the spring may have a third thickness that is equal to or less than the first thickness and the second thickness.

The first plate may have a first thickness and the spring may have a second thickness that is less than one half the first thickness.

With reference to the Figures, a seatbelt assembly 20 of a vehicle 22 includes a monolithic anchor 24 having a first plate 26, a second plate 28 spaced from the first plate 26, and one or more springs 30 connecting the first plate 26 to the second plate 28. The first plate 26 has a webbing mount 32. The second plate 28 has a vehicle mount 34.

The seatbelt assembly 20 restrains an occupant 36 of the vehicle 22, and helps to control movement of the occupant 36 during an impact to the vehicle 22. In particular, the springs 30 of the monolithic anchor 24 stretch during such impact, thereby absorbing energy and reducing a likelihood of injury of the occupant 36, e.g., by reducing tension applied to the occupant 36.

The seatbelt assembly 20, shown in FIG. 1, may include the anchor 24, a retractor 38, a webbing 40, one or more additional anchors 42, a buckle and latch system 44, etc. The seatbelt assembly 20 may be a component of the vehicle 22.

The vehicle 22 may be any type of passenger or commercial automobile such as a car, a truck, a sport utility vehicle, a crossover vehicle, a van, a minivan, a taxi, a bus, etc. The vehicle 22 may include the seatbelt assembly 20, one or more seats 46, one or more pillars, etc. During, e.g., a frontal and/or rear impact, the seatbelt assembly 20 restrains the occupant 36 of the seat 46 and/or limits a displacement of the occupant 36 relative to the seat 46.

The anchor 24 secures the seatbelt assembly 20 to a component of the vehicle 22, e.g., a floor, a frame of the seat 46, a body pillar, etc. For example, first plate 26 may be secured to the webbing 40, and the second plate 28 may be secured to the seat 46.

The anchor 24, shown in FIGS. 1 through 4, is monolithic, i.e., the first plate 26, second plate 28, and the springs 30 are a one-piece unit without any fasteners, joints, welding, adhesive, etc., fixing such components to each other. For example, the first plate 26, second plate 28, and the springs 30 may be formed simultaneously as a continuous unit, e.g., via 3-D printing or other suitable manufacturing process.

The anchor 24 may have a longitudinal axis A1. For example, the anchor 24 may include a first distal end 48 and a second distal end 50 opposite the first distal end 48. The longitudinal axis A1 may extend between the first distal end 48 and the second distal end 50. The anchor 24 may be elongated along the longitudinal axis A1. The first plate 26, the second plate 28, and the springs 30 may be aligned along the longitudinal axis A1, e.g., the springs 30 may be between the first plate 26 and the second plate 28 along the longitudinal axis A1.

The anchor 24 may have a lateral axis A2. The lateral axis A2 is perpendicular to the longitudinal axis A1.

The anchor 24 may be metal, such as Aluminum AlSi10Mg, Inconel 625, Inconel 718, Titanium Ti64, and Cobalt Chrome CoCrMo, etc. The monolithic anchor 24 may be made of stainless steel, such as Stainless Steel 17-4Ph, Stainless Steel 316L, etc. The anchor 24 may be a single type of material. For example, the first plate 26, the second plate 28, and the springs 30 may be a same type of material. The anchor 24 may be multiple types of material.

For example, the first plate 26 and the second plate 28 may be one type of material, and the springs 30 may be another type of material.

The anchor 24 may be 3-D printed. The 3-D printed anchor 24 includes a microstructure that is more uniform than conventionally casted or wrought materials, thereby providing an increase in strength. The microstructure may be a lattice structure designed to provide specific properties to the anchor 24. As one example, the anchor 24 may be 3-D printed using Selective Laser Melting (SLM) techniques. SLM is a particular rapid prototyping technique, e.g., 3D printing, Additive Manufacturing (AM), etc., designed to use a high power-density laser to melt and fuse metallic powders together. As another example, fused deposition modeling (FDM), which uses extruded beads or streams of material which harden to form layers, may be used. As another example, electron beam melting (EMB), which melts layers of metal powder with an electron beam in a high vacuum, may be used. Other 3D printing processes, techniques and materials may be used.

The first plate 26 secures the anchor 24 to the webbing 40, e.g., via the webbing mount 32. The first plate 26 may extend from the first distal end 48 to the springs 30. The first plate 26 may be elongated along the longitudinal axis A1. The first plate 26 may be planar. The first plate 26 may include a top surface 52 and a bottom surface 54 opposite the top surface 52. The top surface 52 and the bottom surface 54 may extend along the longitudinal axis A1 and the lateral axis A2.

Figure 3:
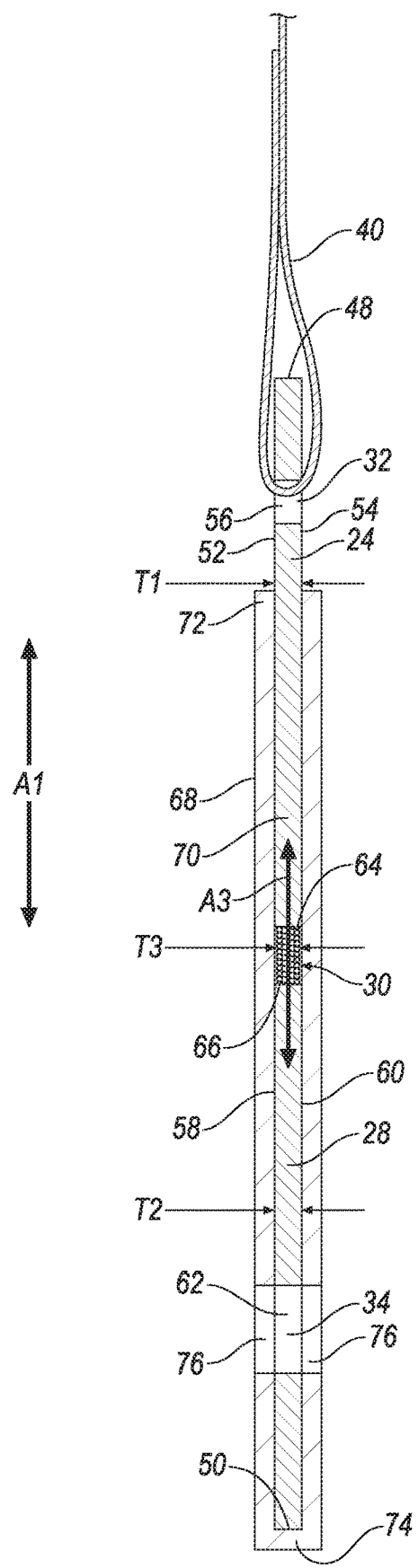
FIG. 3 is a cross-section of the anchor of the seatbelt assembly of FIG. 1.

The first plate 26 has a first thickness T1, shown in FIG. 3. The first thickness T1 may be between the top surface 52 and the bottom surface 54 of the first plate 26. For example, the first thickness T1 may be 3 millimeters.

The webbing mount 32 provides a structure to secure the webbing 40 to the anchor 24. The webbing mount 32 may be a slot 56. Additionally or alternativity, the webbing mount 32 may be one or more holes, one or more fasteners, e.g., clips, bolts, screws, etc., one or more hooks, one or more extrusions, one or more depressions, or any other structure suitable for securing the webbing 40 to the first plate 26, including combinations thereof.

The second plate 28 secures the anchor 24 to the vehicle 22, e.g., to the seat 46, the support pillar, the floor, etc. The second plate 28 may extend from the second distal end 50 to the springs 30. The second plate 28 may be elongated along the longitudinal axis A1. The second plate 28 may be planar. The second plate 28 may include a top surface 58 and a bottom surface 60 opposite the top surface 58. The top surface 58 and the bottom surface 60 may extend along the longitudinal axis A1 and the lateral axis A2.

The second plate 28 is spaced from the first plate 26, e.g., with the springs 30 located therebetween.

The second plate 28 has a second thickness T2. The second thickness T2 may be between the top surface 58 and the bottom surface 60 of the second plate 28. The second thickness T2 may be the same as the first thickness T1. For example, the second thickness T2 may be 3 millimeters.

The vehicle mount 34 provides a structure to secure the anchor 24 to the vehicle 22. The vehicle mount 34 may be a hole 62. Additionally or alternativity, the vehicle mount 34 may be a plurality of holes, one or more slots, one or more fasteners, e.g., clips, bolts, screws, etc., one or more hooks, one or more extrusions, one or more depressions, or any other structure suitable for securing the second plate 28 to the vehicle 22, including combinations thereof.

The one or more springs 30 are designed to deform, e.g., to absorb energy during an impact to the vehicle 22. For example, the springs 30 may be coil springs 30, e.g., having a circular coiled shape. For example, the springs may be magazine springs, tension springs, disc springs, or any other suitable spring design.

Each of the one or more springs 30 may include a first end 64 and a second end 66 opposite the first end 64. The first end 64 may be spaced from the second end 66 along the longitudinal axis A1, e.g., each spring 30 may be aligned along the longitudinal axis A1. The spring 30 may be designed to deform, e.g., stretch, along the longitudinal axis A1. For example, the coil of the springs 30 may define an axial axis A3, i.e., with the coil of the spring 30 being disposed around the axial axis A3. The axial axis A3 of the springs 30 may be parallel with the longitudinal axis A1.

The springs 30 may connect the first plate 26 to the second plate 28. For example, each of the springs 30 may extend from the first plate 26 at the first end 64 of each spring, and each of the springs 30 may extend from the second plate 28 at the second end 66 of each spring 30.

The springs 30 may be spaced from each other along the lateral axis A2. For example, the springs 30 may be parallel to each other and disposed adjacent each other along the lateral axis A2. To put it another way, the first ends 64 of the springs 30 may align with each other along the lateral axis A2, and the second ends 66 of the springs 30 may align with each other along the lateral axis A2.

Each of the springs 30 may have a third thickness T3. The third thickness T3 may be an outer diameter of the coil spring 30. The third thickness T3 may be equal to or less than the first thickness T1 and the second thickness T2. The third thickness T3 may be less than one half the thickness of the thickness of the first plate 26. For example, the third thickness T3 may be 0.7 millimeters.

The springs 30 may be designed to deform upon application of a threshold amount of force F to the anchor 24. In other words, the springs 30 do not deform when a force below the threshold amount is applied to the springs. The threshold amount of force F may be based on a standard crash test dummy. The standard crash test dummy may be a Hybrid III 50th percentile male dummy, a Hybrid III 95th percentile male dummy, a Hybrid III 5th percentile female dummy, a Hybrid III child dummy, etc. For example, vehicle 22 may be subject to a standard crash test, such as an IIHS moderate overlap frontal test, a EuroNCAP moderate overlap test, a NHTSA vehicle-to-vehicle side impact test, etc., with the standard crash test dummy as the occupant 36. If results of such test shown that the dummy was subject to greater forces than desired, than the anchor 24 may be designed to have less springs 30, the springs 30 may be designed to be less stiff, e.g., via material selection, geometric design changes, etc.

The springs 30 may be less stiff than the first plate 26 and the second plate 28 along the longitudinal axis A1. For example, an amount of force F along the longitudinal axis A1 required to deform the springs 30, e.g., along the axial axis A3, may be less than an amount force of along the longitudinal axis A1 required to deform the first plate 26 and/or the second plate 28.

The springs 30 may be less stiff than the first plate 26 and the second plate 28 under tension. For example, an amount of tensile force F required to deform the springs 30 may be less than an amount of tensile force required to deform the first plate 26 and/or the second plate 28. For example, the webbing 40 may apply the force F to the first plate 26 of the anchor 24 along the longitudinal axis A1, e.g., along the axial axis A3, and away from the anchor 24, and the securement of the second plate 28 to the vehicle 22 component may provide a reaction force RF in an opposite direction, thereby placing the first plate 26, the second plate 28, and the springs 30 under tension. Under such tension the springs 30 may deform while the first plate 26 and the second plate 28 do not deform.

The anchor 24 may have a coating, such as paint. The coating may protect the anchor 24, e.g. from corrosion, and provide an aesthetic appearance to the anchor 24.

The seatbelt assembly 20 may include a sleeve 68. The sleeve 68 may cover and protect the anchor 24. The sleeve 68 may be plastic, e.g., a nylon, acrylonitrile butadiene styrene (ABS), vinyl, etc., or any other suitable material.

The sleeve 68 may define a chamber 70. The sleeve 68 may include an open end 72 and a closed end 74 opposite the open end 72. The open end 72 provides access to the chamber 70.

The sleeve 68 may define a hole 76. The hole 76 may be proximate the closed end 74, i.e., the hole 76 may be closer to the closed end 74 than to the open end 72.

The anchor 24 may be disposed within the sleeve 68, e.g., within the chamber 70. The second plate 28 and the springs 30 may be completely disposed within the chamber 70. For example, the second distal end 50 of the anchor 24 may abut the closed end 74 of the sleeve 68. The hole 62 of the second plate 28 may be axially aligned with the hole 76 of the sleeve 68, e.g., permitting a fastener to be disposed within the holes 62, 76 to secure the anchor 24 to the vehicle 22. The first plate 26 may extend from the sleeve 68 at the open end 72, e.g., such that the webbing mount 32 is outside of the chamber 70.

The seatbelt retractor 38 may be attached to a component of the vehicle 22, e.g. to one of the pillars, to one of the seats 46, etc. The seatbelt retractor 38 may be attached in any suitable manner, e.g., with one or more fasteners, etc. The seatbelt retractor 38 may include a spool. The spool may freely rotate within the retractor 38. The spool may be adapted to receive the webbing 40, for example, by including a webbing attachment slot and permitting the webbing 40 to wind around the spool. The seatbelt retractor 38 may include a locking mechanism that inhibits rotation of the spool when the vehicle 22 is subject to deceleration above a threshold amount, e.g., during the impact of the vehicle 22.

The webbing 40 may be formed of fabric in the shape of a strap. The webbing 40 may be attached to the spool, with the webbing 40 wound around the spool. The webbing 40 may be payable from the retractor 38, e.g., when the spool is not prevented from rotating by the locking mechanism.

The webbing 40 may be secured to the first plate 26, e.g., to the webbing mount 32. For example, the webbing 40 may be disposed within the slot 56. To put it another way, the webbing 40 may enter one side of the slot 56, e.g., at the top surface 52, and exit an opposite of the slot 56, e.g., at the bottom surface 54. Such webbing 40 may be secured to itself, e.g., via stitching, etc., defining a loop with a portion of the first plate 26 between the slot 56 and the first distal end 48 disposed within the loop.

Figure 4:
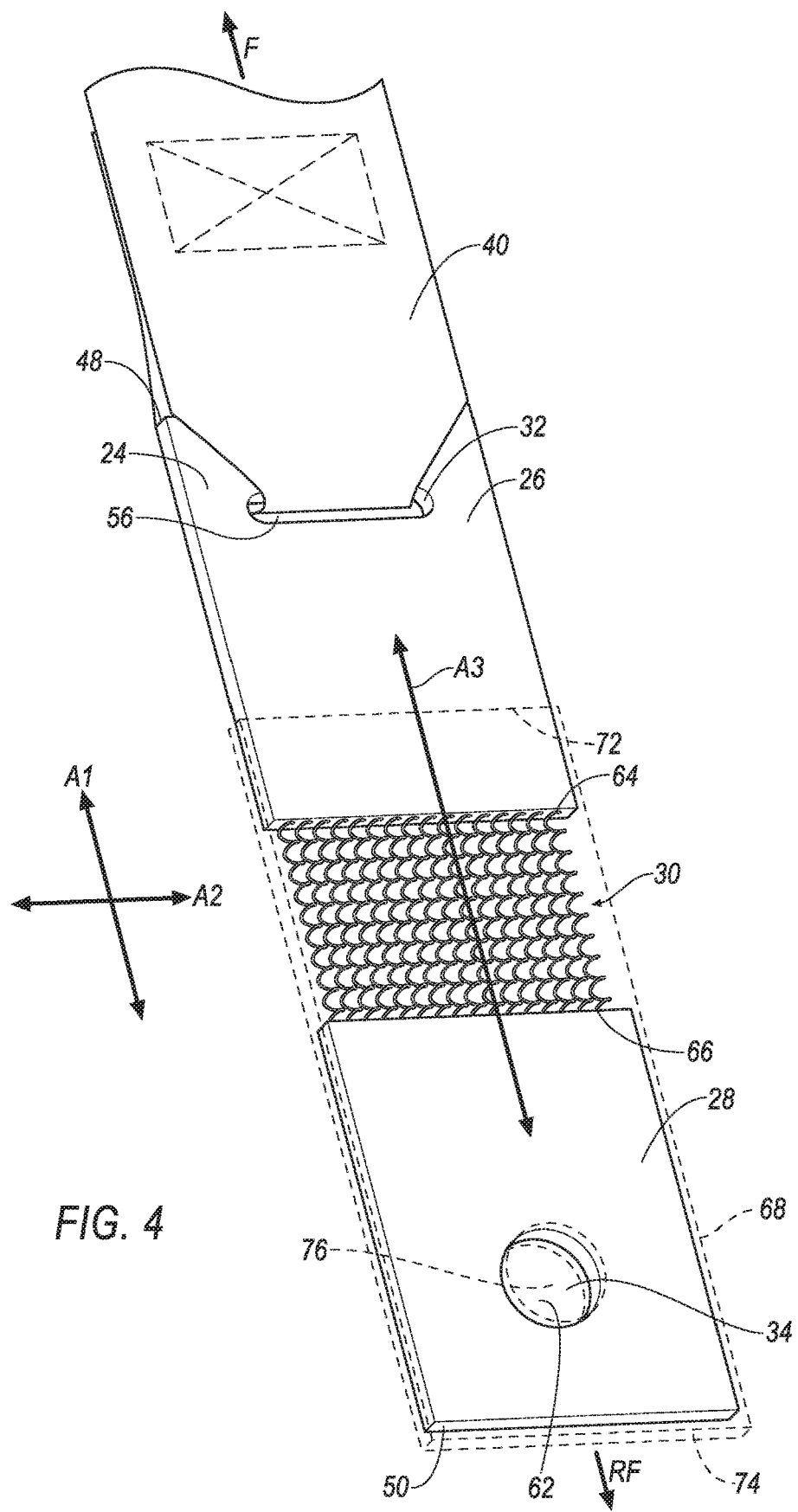
FIG. 4 is a perspective view the anchor of the seatbelt assembly of FIG. 1 with an applied force.

During an impact to the vehicle 22 the webbing 40 may restrain the occupant 36 of the vehicle 22, thereby creating the tensile force F in the webbing 40. Such force F is transferred to anchor 24 and is applied along the axial axis A3. The tensile force F causes the springs 30 to stretch, as shown in FIG. 4, thereby absorbing some of the energy transferred to the webbing 40 during the impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt assembly comprising:
a monolithic anchor having a first plate, a second plate spaced from the first plate, and at least one spring connecting the first plate to the second plate;
the first plate having a webbing mount;
the second plate having a vehicle mount; and
a sleeve defining a chamber extending from the first plate to the second plate and fully surrounding the spring, the second plate completely disposed within the chamber;
wherein the first plate has a first thickness, the second plate has a second thickness, and the spring has a third thickness that is less than the first thickness and the second thickness.

2. The seatbelt assembly of claim 1, wherein the spring is a coil spring.

3. The seatbelt assembly of claim 1, wherein the monolithic anchor is metal.

4. The seatbelt assembly of claim 1, wherein the sleeve includes an open end and a closed end opposite the open end, the first plate extending from the sleeve at the open end.

5. The seatbelt assembly of claim 1, wherein the spring is completely disposed within the chamber.

6. The seatbelt assembly of claim 1, wherein the sleeve is plastic.

7. The seatbelt assembly of claim 1, wherein the vehicle mount is a first hole, and the sleeve defines a second hole axially aligned with the first hole.

8. The seatbelt assembly of claim 1, wherein the spring is designed to deform upon application of a threshold amount of force, the threshold amount of force based on a standard crash test dummy.

9. The seatbelt assembly of claim 8, wherein the standard crash test dummy is a Hybrid III 50th percentile male dummy.

10. The seatbelt assembly of claim 1, wherein the monolithic anchor is 3-D printed.

11. The seatbelt assembly of claim 1, wherein the monolithic anchor has a longitudinal axis, and the first plate, the second plate, and the spring are aligned along the longitudinal axis, and the spring is less stiff than the first plate and the second plate along the longitudinal axis.

12. The seatbelt assembly of claim 1, wherein the spring is less stiff than the first plate and the second plate under tension.

13. The seatbelt assembly of claim 1, wherein the monolithic anchor has a lateral axis, and wherein the at least one spring includes a plurality of springs spaced from each other along the lateral axis and connecting the first plate to the second plate.

14. The seatbelt assembly of claim 1, further comprising a webbing secured to the first plate.

15. The seatbelt assembly of claim 14, wherein the webbing mount is a slot, and the webbing is disposed within the slot.

16. The seatbelt assembly of claim 1, wherein the first plate, the second plate, and the spring are formed of a same type of material.

17. The seatbelt assembly of claim 1, wherein the monolithic anchor is made of stainless steel.

* * * * *